(12) United States Patent
Shafiee (10) Patent No.: US 8,812,895 B2
(45) Date of Patent: Aug. 19, 2014

(54) SYSTEM REDUNDANCY AND SITE RECOVERY

(75) Inventor: Mohammad Reza Shafiee, Ridgefield, CT (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 289 days.

(21) Appl. No.: 13/300,703

(22) Filed: Nov. 21, 2011

(65) Prior Publication Data

US 2013/0132764 A1   May 23, 2013

(51) Int. Cl.
*G06F 11/00* (2006.01)

(52) U.S. Cl.
USPC ............. 714/4.11; 714/4.1; 714/13; 714/47.1

(58) Field of Classification Search
USPC ........... 714/1, 2, 4.1, 4.11, 10, 11, 13, 25, 39, 714/47.1
See application file for complete search history.

(56) References Cited

U.S. PATENT DOCUMENTS

| | | | |
|---|---|---|---|
| 7,512,948 B2* | 3/2009 | Chen et al. | 714/2 |
| 2002/0083118 A1* | 6/2002 | Sim | 709/105 |
| 2004/0032348 A1* | 2/2004 | Lai et al. | 341/50 |
| 2005/0257085 A1* | 11/2005 | Haustein et al. | 714/13 |
| 2006/0161635 A1* | 7/2006 | Lamkin et al. | 709/217 |
| 2007/0220525 A1* | 9/2007 | State et al. | 718/107 |
| 2008/0005349 A1* | 1/2008 | Li et al. | 709/231 |
| 2008/0140965 A1* | 6/2008 | Martin et al. | 711/162 |
| 2010/0031310 A1* | 2/2010 | Konetski et al. | 726/1 |

* cited by examiner

*Primary Examiner* — Joseph D Manoskey (57) ABSTRACT

A method may include receiving an order associated with processing a media file and forwarding the order to a resource management system. The method may also include identifying, by the resource management system, tasks associated with fulfilling the order, storing the plurality of tasks and identifying an execution system to execute the tasks. The method may further include forwarding, by the resource management system, the tasks to the execution system.

19 Claims, 8 Drawing Sheets

SYSTEM REDUNDANCY AND SITE RECOVERY

BACKGROUND INFORMATION

Consumer demand for media is increasing. For example, consumers often watch and/or listen to various media at home, while traveling, at work, etc. As a result, the number of communication channels for delivering media content and the number of different types of devices for playing the content has also increased.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Implementations described herein relate to an infrastructure for allowing customers to submit orders for processing content, such as media content. The infrastructure facilitates processing of the orders using workflows that represent tasks to be performed. The infrastructure may also include multiple sites which each include some redundancy to allow for recovery from a failure or problem in one of the multiple sites. The infrastructure may also provide for inter-site recovery from a problem or failure by monitoring execution of tasks by network elements used to fulfill the tasks.

Figure 1:
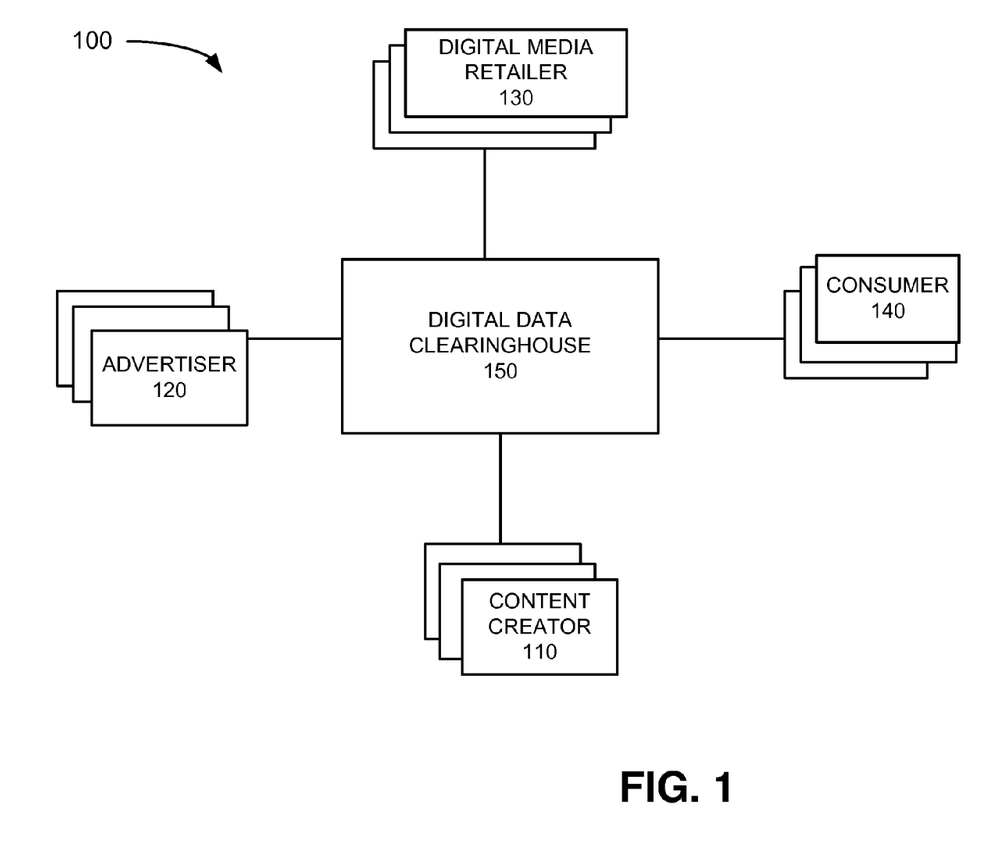
FIG. 1 schematically illustrates an exemplary network in which systems and methods described herein may be implemented.

FIG. 1 is a block diagram of an exemplary network in which systems and methods described herein may be implemented. Referring to FIG. 1, network 100 includes one or more content creators 110, one or more advertisers 120, one or more digital media retailers (DMRs) 130, one or more consumers 140 and digital data clearinghouse (DDC) 150. The exemplary configuration illustrated in FIG. 1 is provided for simplicity. It should be understood that a typical network may include more or fewer devices than illustrated in FIG. 1.

Content creator 110 (referred to collectively as content creators 110 or individually as content creator 110) may represent one or more creators of content that wish to package and/or distribute the content to other parties, such as consumers 140. For example, content creators 110 may include movie or television studios, music companies, publishers, game developers, parties who generate user generated content (UGC), websites, blogsites, etc. Content creators 110 may provide content to DDC 150 for transcoding, packaging and/or distribution, as described in detail below. The term "content," as used herein, may include any type of media, such as video, audio, multi-media, textual data, etc. The term "content" may also be referred to herein as "video assets" or "assets."

Advertiser 120 (referred to collectively as advertisers 120 or individually as advertiser 120) may represent one or more parties that wish to insert advertising into media files. For example, advertiser 120 may contract with a content creator 110 and/or digital media retailer 130 to insert an advertisement into a media stream provided to consumers 140. DDC 150 may insert the advertisement into the stream in accordance with the agreement between the parties.

DMR 130 may represent one or more business entities that receive media content from various parties and resell it to end users. For example, DMRs 130 may include broadcasters, cable companies, direct broadcast satellite (DBS) providers, Internet protocol television (IPTV) providers, mobile phone TV providers, online retailers, etc. DMRs 130 may receive media content from DDC 150 and sell/provide the content to consumers 140.

Consumer 140 may represent one or more consumers 140 that receive content originally generated by or provided by content creators 110 and that has been processed by DDC 150. For example, DDC 150 may format and package content for distribution by DMRs 130 and/or DDC 150 to consumers 140.

DDC 150 may include a server/computing device or a set of servers/computing devices associated with, for example, processing media content. For example, as described briefly above, DDC 150, also referred to herein as DDC platform 150, may provide an automated environment in which content from content creators 110 is transformed and packaged for distribution in any number of formats, based on the particular requirements associated with DMRs 130. In an exemplary implementation, DDC 150 may also aggregate various data and insert advertisements into the media content. DDC 150, consistent with implementations described herein, may also utilize flexible workflows to streamline the formatting and packaging of content for digital distribution. DDC 150, consistent with implementations described herein, may also include multiple sites for implementing the services described herein. The multiple sites may allow for redundancy and recovery from problems that may occur when processing orders, as described in detail below.

As described above, the exemplary configuration illustrated in FIG. 1 is provided for simplicity. It should be understood that a typical network may include more or fewer devices than illustrated in FIG. 1. For example, it should be understood that network 100 may include a large number (e.g., hundreds or thousands) of different types of user devices associated with consumers 140, such as televisions, cellular telephones, personal computers (PCs), laptop computers, tablet computers, notebook computers, netbook computers, personal digital assistants (PDAs), etc.

It should also be understood network 100 may include one or more wired, wireless and/or optical networks (not shown) that interconnect the components illustrated in FIG. 1 and enable the components in FIG. 1 to communicate with one another. For example, network 100 may include one or more public switched telephone networks (PSTNs) or other type of switched network. Network 100 may also include one or more wireless networks and may include a number of transmission towers for receiving wireless signals and forwarding the wireless signals toward the intended destination. Network 100 may further include one or more satellite networks, one or more packet switched networks, such as an Internet protocol (IP) based network, a local area network (LAN), a wide area network (WAN), an intranet, the Internet, or another type of network that is capable of transmitting data from a source device to a destination device.

Further, various functions are described below as being performed by particular components in network 100. In other implementations, various functions described below as being performed by one device may be performed by another device or multiple devices, and various functions described as being performed by multiple devices may be combined and performed by a single device.

Figure 2:
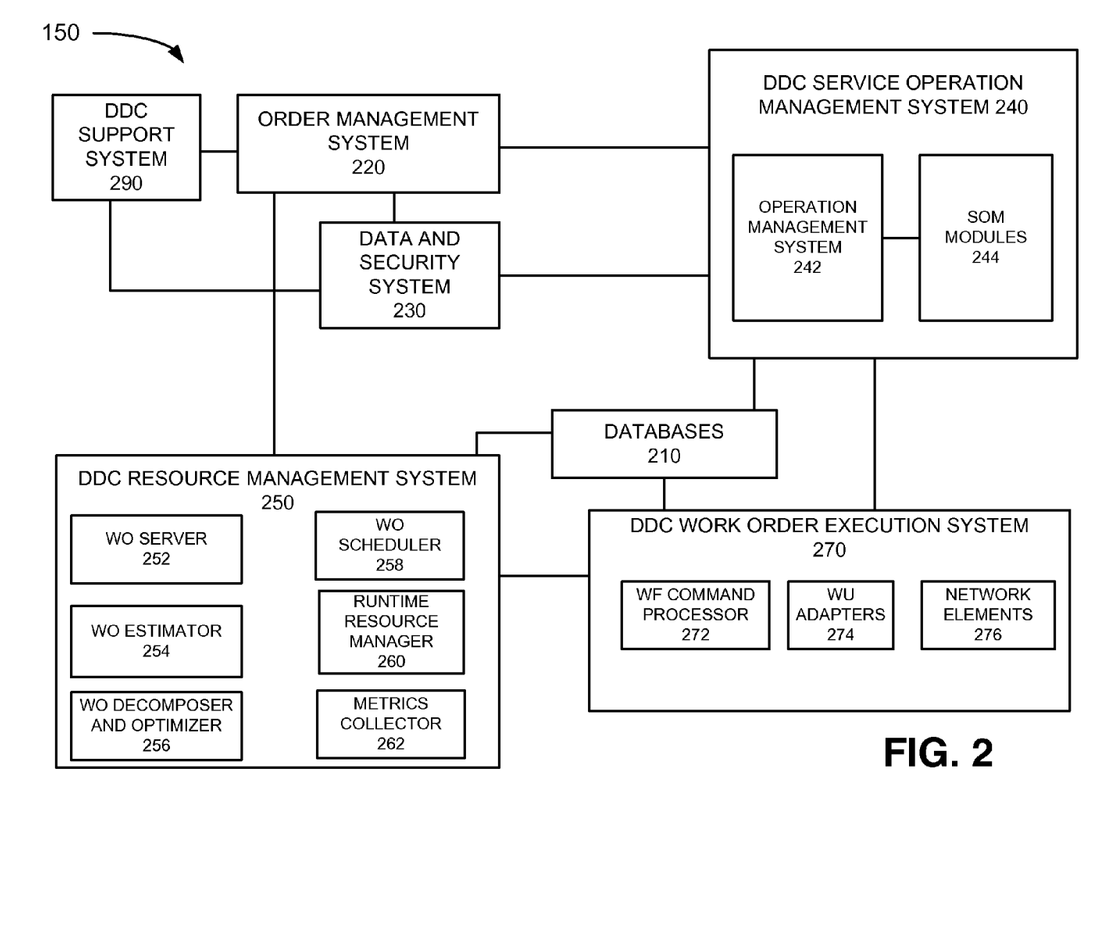
FIG. 2 illustrates an exemplary architecture associated with one of the components of FIG. 1 in which systems and methods described herein may be implemented.

FIG. 2 illustrates an exemplary configuration of DDC 150. As discussed briefly above, DDC 150 may include multiple sites that allow for redundancy and recovery from problems that may occur during the processing or execution of orders. FIG. 2 illustrates components that may be included in one of the sites associated with DDC 150. Referring to FIG. 2, DDC 150 may include databases 210, order management system 220, data and security system 230, DDC service operation management (SOM) system 240, DDC resource management system 250, DDC work order execution (WOE) system 270 and DDC support system 290.

Databases 210 may store work unit definitions, workflows, parameters, tables that are associated with various components in DDC 150, intermediate or end results of processing performed by different processes in DDC 150, etc. The term "work unit," as used herein, may refer to a description of a set of one or more operations that a system may perform on content (e.g., overlaying subtitles on a video, inserting advertisements into a video, reformatting a video, etc.).

Order management system 220 may include one or more computing devices or servers for managing customer orders, generating reports, etc. In an exemplary implementation, order management system 220 may include client components that interface with components on DDC service operation management system 240. The client components (e.g., web browser) may receive customer orders, requests for reports, etc., and relay the received information to the components on DDC service operation management system 240 for the creation, validation, estimation, submission, approval, execution and reporting of activities associated with the customer orders, request for reports, etc. For example, a customer order may be completed by sending, to a component on DDC service operation management system 240, a selection of a particular workflow that will drive the processing of content associated with the order. In an exemplary implementation, DDC 150 may include two or more order management systems 220 to facilitate efficient processing of orders, as well as provide redundancy in the event of a problem or failure in one of the order management systems 220, as described in detail below.

Data and security system 230 may include one or more computing devices or servers that provide for authentication and authorization of users having roles in DDC 150 and/or for taking actions that are associated with the authorized roles (e.g., create user accounts, remove user accounts, generate an initial password, etc.). For example, when a user logs in as a DDC operator, the user may be authorized to design work units and/or compose workflows. In an exemplary implementation, data and security system 230 may interface with order management system 220, DDC SOM system 240 and DDC support system 290.

DDC service operation management (SOM) system 240 may include one or more servers or computing devices to control the overall operation, configuration, and management of DDC 150. For example, DDC SOM system 240 may include operation management system 242 and SOM modules 244. Via a client component that communicates with operation management system 242, a user may control the configuration, administration and operation of DDC 150. For example, in one implementation, via a web browser or another client application, a user may control security, compose a workflow, administer accounts that are associated with content creator 110 or DMR 130, submit a work order, add data and storage to DDC 150, manage resources, manage DDC configuration (e.g., create a work unit), manage catalogs of content, run reports, monitor DDC work order (e.g., information associated with a work order), etc.

In providing each of such services to a client, operation management system 242 may employ SOM modules 244. SOM modules 244 may include components/modules that correspond to the above-listed services. For example, SOM modules 244 may include a security manager, workflow manager, account manager, work order manager, data and storage manager, resource management module, configuration manager, asset management module, catalog management module, monitoring and reporting module, etc. DDC SOM system 240 may further include an operational graphical user interface (GUI) for interfacing with SOM modules.

DDC resource management system 250 may include one or more servers or computing devices that support the capacity management of resources associated with network elements (NEs) in DDC 150. As illustrated in FIG. 2, DDC resource management system 250 may include work order (WO) server 252, WO estimator 254, WO decomposer and optimizer 256, WO scheduler 258, runtime resource manager 260 and metrics collector 262. Components 252-262 may aid in scheduling and allocating resources associated with fulfilling customer orders, as described in detail below.

WO server 252 may provide work order-related interfaces to operation management system 242 and/or SOM modules 244, and may communicate with WO estimator 254, WO decomposer and optimizer 256, and WO scheduler 258 to submit, decompose, validate, and save work orders, and to estimate, schedule, and reserve resources during the order submission.

Work order estimator 254 may estimate the cost of completing a decomposed work order across work units of a workflow, based on resources that are associated with the work units for each resource type. Work order estimator 254 may store the cost in one of databases 210 in terms of resource capacity units (RCUs) and duration of time required to complete tasks or processes that are associated with the work order.

WO decomposer and optimizer 256 may break down an order into work units based on the workflow associated with the order. Furthermore, based on the decomposition, WO decomposer and optimizer 256 may generate work unit tasks, or simply "tasks," assign task parameters, and create task connectors, which are described below.

WO scheduler 258 may match cost estimates for different resource types for a work order to available time slots in an allocation schedule across different network elements (e.g., hardware/software components that perform underlying operations for a work unit). As a result of the scheduling, WO scheduler 258 may output start and end times for each of the work unit tasks and for resource reservations.

Runtime resource manager 260 may allocate network elements (NEs) and/or user groups (UGs) to a process at the time of execution on behalf of a work unit. Runtime resource manager 260 may attempt to honor scheduled reservations of resources. However, if the resources are unavailable, runtime resource manager 260 may attempt to obtain replacement resources.

Metrics collector 262 may determine, for each work unit, actual time of completion and used/consumed resources associated with the execution of the work unit. Based on previous actual execution measurements, metrics collector 262 may modify factors that are used to estimate the resource and time necessary to complete a task associated with a work unit for a particular asset.

In an exemplary implementation, resource management system 250 may represent the functions performed by various NEs used to execute work order tasks as resource types and represent the capacity of the NEs using resource capacity units (RCUs). The term "resource type," as used herein, may include categories of consumable network resources used to schedule, reserve, bill and manage network capacity. Examples of resource types include bandwidth, storage, the ability to transcode an asset from one format into another format. Resource types may also include resources associated with humans involved in the processing of assets, such as a human's ability to review a movie asset, etc. The term "RCU", as used herein, may include the unit of measure for a resource type. Examples of RCUs include megabits for bandwidth, gibabytes for storage, transcoding task units and/or CPU processing time for transcoding operations, etc. In an exemplary implementation, DDC 150 may include two or more resource management systems 250 to facilitate managing execution of orders, as well as provide redundancy in the event of a problem or failure in one of the resource management systems 250, as described in detail below.

DDC work order execution (WOE) system 270 may include one or more servers or computing devices to manage the flow and execution of work units of a defined workflow associated with a work order. DDC WOE system 270 may include a workflow (WF) command processor 272 (also referred to herein as command processor 272), work unit (WU) adapters 274, and network elements 276. For simplicity, FIG. 2 does not show other components of WOE system 270. Depending on the implementation, DDC WOE system 270 may include additional, fewer, or different components than those illustrated in FIG. 2. For example, WOE system 270 may include a work unit processor (not shown).

Command processor 272 may drive work order execution. Command processor 272 may include a WO manager and WO processor. The WO manager may provide interfaces to resource management system 250 for initiating an execution of a work order, retrieving the status of the work order, suspending/resuming the work order execution, canceling the work order, etc. The WO processor may coordinate work unit tasks for completion of a work order. In coordinating different work unit tasks, the WO processor may sequence the tasks for optimum execution time and resource utilization. The WO processor may communicate with runtime resource manager 260 for allocation and de-allocation of resources. The work unit processor may dispatch processes/threads to perform a work unit task.

Work unit adapter 274 may include interfaces for adapting network elements to perform media content processing corresponding to a work unit. In one implementation, each work unit adapter 274 may be versioned and may include Java code. Each work unit adapter 274 may monitor the corresponding network element to prevent over-allocation of the network element, maintain normal execution of logic associated with the network element, and provide real-time information to metrics collector 262.

Network elements 276 may include physical or logical network devices/components for processing media content. In an exemplary implementation, DDC 150 may include two or more work order execution systems 270 to provide for efficient processing or work orders, as well as provide redundancy in the event of a problem or failure in one of the work order execution systems 270, as described in detail below.

DDC support system 290 may include one or more servers or computing devices and/or personnel to provide support services, such creation of work units, composition of workflows, etc., billing support, contracting management, pricing, etc.

The configuration shown in FIG. 2 is for illustrative purposes. In other configurations and/or implementations, functions that are associated with one component or system shown in FIG. 2 may be performed by one or more other components in FIG. 2, any of the components may be connected to any other of the components, and functions of one component may be included in another component. Accordingly, in the other configurations or implementations, DDC 150 may include additional, fewer, different, or a different arrangement of components than those illustrated in FIG. 2. For example, as discussed briefly above, DDC 150 may include multiple ones of the systems illustrated in FIG. 2 to provide for redundancy when a problem occurs. In some implementations, the multiple components may be located at different physical sites, discussed in further detail below.

Figure 3:
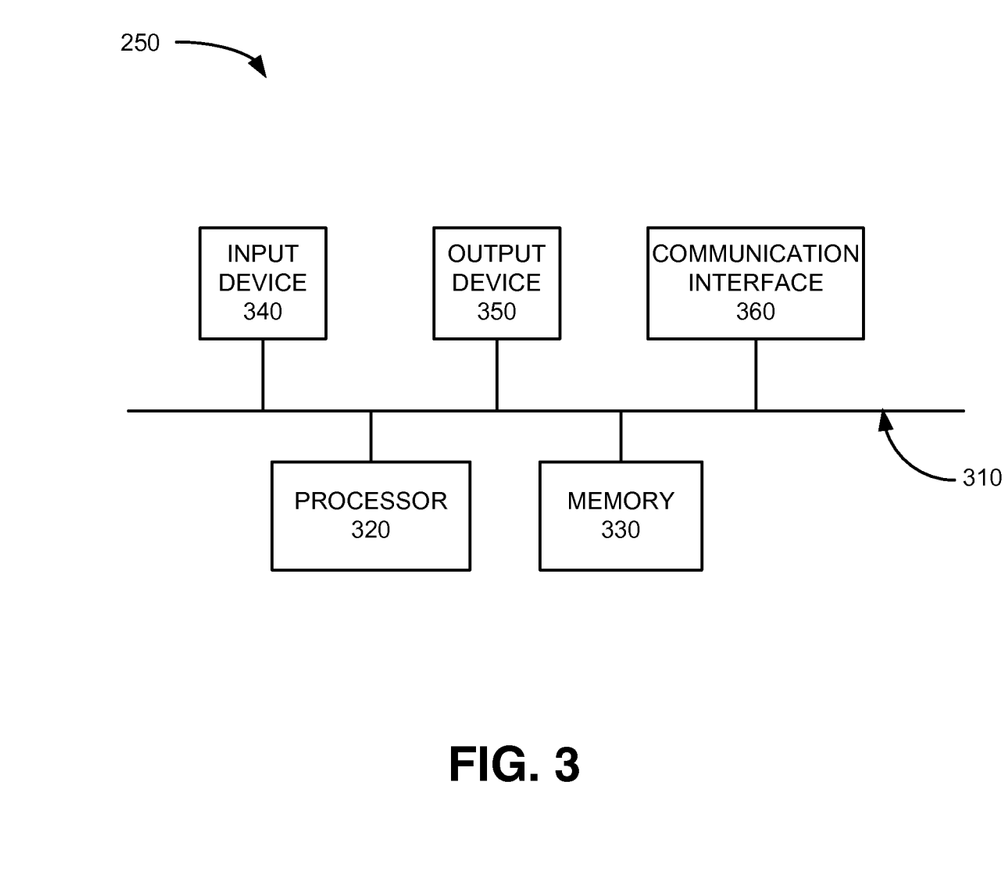
FIG. 3 illustrates an exemplary configuration of one or more of the components of FIG. 2.

FIG. 3 illustrates an exemplary configuration of one or more devices on which DDC resource management system 250 and/or components of DDC resource management system 250 may be implemented. For example, one or more of WO server 252, WO estimator 254, WO decomposer and optimizer 256, WO scheduler 258, runtime resource manager 260 and metrics collector 262 may be implemented on one or more devices configured as illustrated in FIG. 3. Other components in DDC 150, such as components in order management system 220, data and security system 230, DDC SOM system 240, DDC work order execution system 270 and DDC support system 290 may be configured in a similar manner. Referring to FIG. 3, DDC resource management system 250 (or one or more components of DDC resource management system 250) may include bus 310, processor 320, memory 330, input device 340, output device 350 and communication interface 360. Bus 310 may include a path that permits communication among the elements of DDC resource management system 250.

Processor 320 may include one or more processors, microprocessors, or processing logic that may interpret and execute instructions. Memory 330 may include a random access memory (RAM) or another type of dynamic storage device that may store information and instructions for execution by processor 320. Memory 330 may also include a read only memory (ROM) device or another type of static storage device that may store static information and instructions for use by processor 320. Memory 330 may further include a solid state drive (SDD). Memory 330 may also include a magnetic and/or optical recording medium (e.g., a hard disk) and its corresponding drive.

Input device 340 may include a mechanism that permits a user to input information to DDC resource management system 250, such as a keyboard, a keypad, a mouse, a pen, a microphone, a touch screen, voice recognition and/or biometric mechanisms, etc. Output device 350 may include a mechanism that outputs information to the user, including a display, a printer, a speaker, etc.

Communication interface 360 may include a transceiver for communicating with other devices within system 250 or outside system 250 (e.g., order management system 220, DDC WOE system 270, databases 210) via wired, wireless or optical mechanisms. Communication interface 360 may also include one or more radio frequency (RF) transmitters, receivers and/or transceivers and one or more antennas for transmitting and receiving RF data via network 100. Communication interface 360 may also include a modem or an Ethernet interface to a LAN or other mechanisms for communicating with elements in a network or system, such as network 100 or system 150, or another network/system.

The exemplary configuration illustrated in FIG. 3 is provided for simplicity. It should be understood that devices in system 250 may include more or fewer devices than illustrated in FIG. 3. In an exemplary implementation, one or more components of system 250 may perform operations in response to processor 320 executing sequences of instructions contained in a computer-readable medium, such as memory 330. A computer-readable medium may be defined as a physical or logical memory device. The software instructions may be read into memory 330 from another computer-readable medium (e.g., a hard disk drive (HDD), SSD, etc.), or from another device via communication interface 360. Alternatively, hard-wired circuitry may be used in place of or in combination with software instructions to implement processes consistent with the implementations described herein. Thus, implementations described herein are not limited to any specific combination of hardware circuitry and software.

As described above, DDC 150 may be used to package and distribute content, provided by content creators 110, to consumers 140 via a number of different communication channels and having a number of different formats. As also described briefly above, DDC 150 may be implemented using an architecture/infrastructure that provides for redundancy and allows for recovery from problems associated with processing and executing customer orders, as described in detail below.

Figure 4:
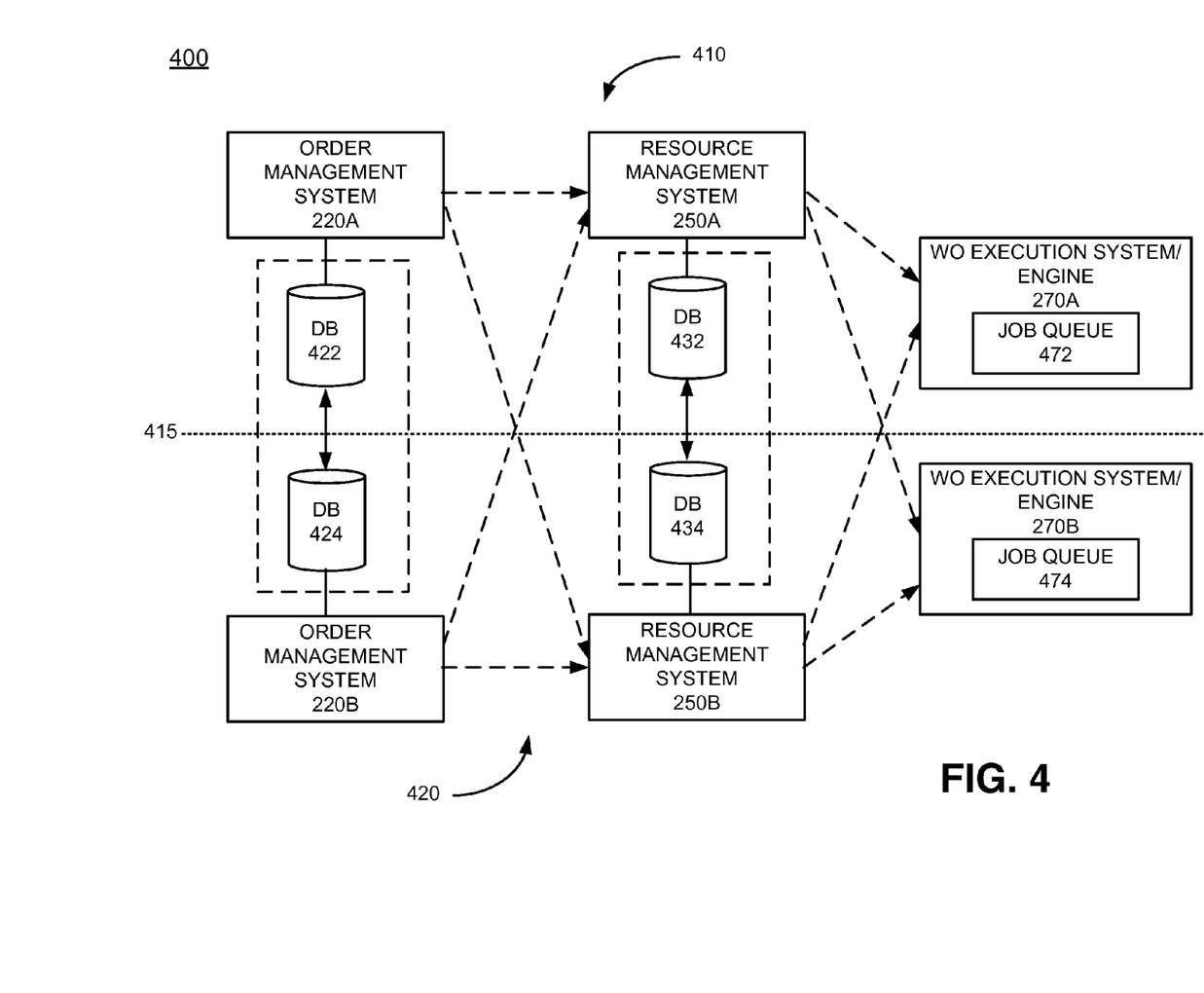
FIG. 4 illustrates a more detailed view of a portion of components of the digital data clearinghouse of FIG. 1 according to an exemplary implementation.

FIG. 4 illustrates an exemplary architecture 400 associated with a portion of DDC 150 consistent with implementations described herein. Referring to FIG. 4, architecture 400 may include two physical sites, labeled 410 and 420, shown separated by dotted line 415. In an exemplary implementation, each of sites 410 and 420 may be deployed in separate physical locations and may include all or portions of the DDC infrastructure described above with respect to FIG. 2. Having separate sites 410 and 420 associated with components of DDC 150 may facilitate recovery from a problem in one of the two sites 410 and 420. Each site 410/420 may include its own instance of order management system 220 (labeled 220A and 220B), resource management system 250 (labeled 250A and 250B) and DDC work order execution system 270 (labeled 270A and 270B, also referred to herein as work order execution engine 270A/B). In an exemplary implementation, order management system 220A/B and resource management system 250A/B of each site 410/420 will use separate database instances, labeled 422 and 432 for site 410, and labeled 424 and 434 for site 420. Sites 410 and 420 may also include one or more high speed connections between the sites 410/420 to facilitate synchronization of information.

Order management system 220A may store work orders in database 422. Similarly, order management system 220B may store work orders in database 424. In an exemplary implementation, databases 422 and 424 and/or order management systems 220A and 220B exchange information regarding work orders that are scheduled for execution. In this manner, databases 422 and 424 will be synchronized such that when a problem occurs in one of sites 410 or 420, the order management system 220A/B of the other site may take over processing while the problem is being resolved.

Resource management systems 250 may operate in a "clustered" environment so that each order management system 220 may send order estimation and/or scheduling requests to the resource management system 250A/B that is best suited to fulfill the particular order. For example, order management system 220A/B may take into consideration the current workload, processing capabilities/bandwidth, etc., of each resource management system 250A/B when determining where to send a particular order.

Similarly, resource management systems 250A/B may send work orders for execution to the WO execution engine 270A/B that is best suited to fulfill the particular order. For example, resource management systems 250A/B may take into consideration the scheduled time frame/deadline for completing the work order, as well as the current workload, bandwidth, etc., of each WO execution engine 270A/B when determining where to send a particular order for execution. As an example, resource management system 250A may send a first order associated with one type of transcoding (e.g., transcoding content having an MPEG 2 (MP2) format into a windows media video (WMV) format) to execution engine 270A, and send a second order associated with another type of transcoding (e.g., transcoding content having an audio video interleave (AVI) format into a WMV format) to execution engine 270B. In an exemplary implementation, databases 432 and 434 and/or resource management systems 250A and 250B exchange information regarding work orders. In this manner, databases 432 and 434 will be synchronized such that when a problem occurs in one of sites 410 or 420, the resource management system 250A/B of the other site may take over processing while the problem is being resolved.

WO execution engines 270A/B may operate to execute work orders received from resource management systems 250A/B. WO execution systems 270A/B may each include a job queue that stores jobs that are queued for execution. For example, WO execution engine 270A includes job queue 472 and WO execution engine 270B includes job queue 474. Each job in job queue 472/474 may include an identifier associated with the corresponding job, such as pending, executing, suspended, etc. The status identifiers may be used to recover, for example, suspended jobs when a problem occurs in WO execution engine 270A or 270B.

As described above, order management system 220A/B and resource management system 250A/B may operate to handle customer orders and execute the customer orders. Architecture 400 of DDC 150 may also facilitate site selection and work order execution in an efficient manner, as described in more detail below.

Figure 5:
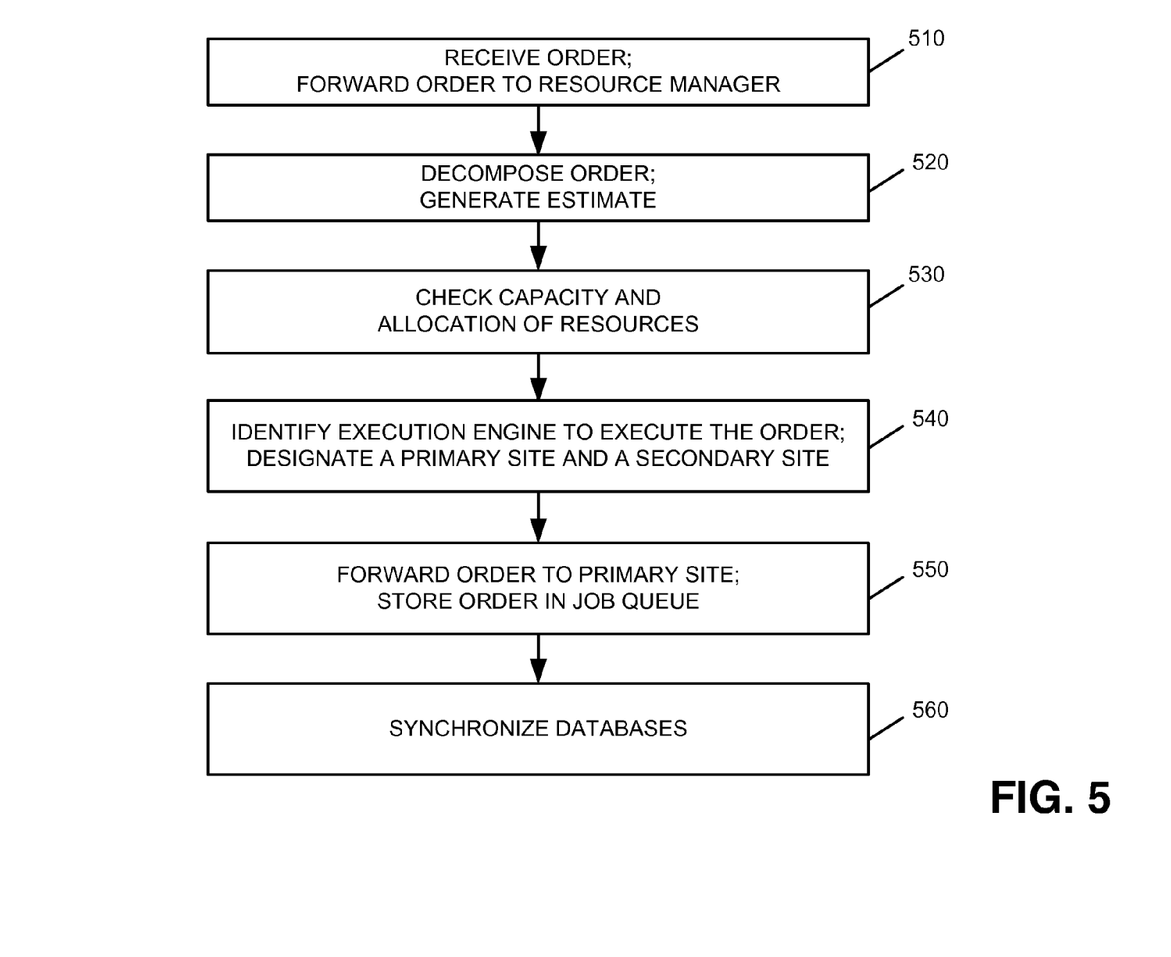
FIGS. 5-7 are flow diagram illustrating exemplary processing associated with the components of FIG. 4.

FIG. 5 is an exemplary flow diagram illustrating processing associated with site selection in architecture 400. Processing may begin with order management system 220A/B receiving an order (block 510). For example, order management system 220A may receive an order associated with a particular transcoding of a media file. As discussed previously, each of sites 410 and 420 may be located at separate physical sites/locations. As a result, order management system 220A may initially receive orders associated with customers that are located physically closer to site 410 than site 420. Order management system 220A may store the order in database 422. In other implementations, a customer may designate a preferred site/service area when placing an order. As an example, a customer may indicate a preference for processing to be performed by site 410.

In an exemplary implementation, each of order management systems 220A and 220B may include a temporary memory to store information associated with a customer order. When an order is received at one of sites 410 or 420, the order is replicated to the other site's temporary memory for backup and recovery purposes.

Order management system 220A may also forward the order to one of the resource management systems 250 in the resource management cluster (block 510). In one implementation, order management system 220A/B will generally favor the resource management system 250A/B that is located in the same site as the sending order management system 220A/B, if all other criteria regarding the best resource management system 250 to handle the order are the same with respect to resource management system 250A and 250B. For example, order management system 220A will generally favor resource management system 250A over resource management system 250B and order management system 220B will generally favor resource management system 250B over resource management system 250A, absent other factors that make one of the resource management systems 250A/B the better choice for handling a particular order.

In other implementations, the customer-designated preferred site/service area may be taken into consideration when forwarding the order to one of resource management systems 250A or 250B. That is, order management system 220A/B will forward the order to the resource management system 250A or 250B associated with the site (e.g., site 410 or 420) designated by the customer as the preferred site. In this example, assume that order management system 220A forwards the order to resource management system 250A and that resource management system 250A receives the order.

As discussed above with respect to FIG. 2, WO server 252 (of resource management system 250A) may receive and process customer orders received from order management system 220A. WO server 252 may forward the order to WO decomposer and optimizer 256. WO decomposer and optimizer 256 may decompose the order (block 520). For example, as described above, WO decomposer and optimizer 256 may break down the customer order into a WO based on the associated work flow and preset parameter settings. In an exemplary implementation, WO decomposer and optimizer 256 may generate work unit tasks, task parameters and task connectors based on the work flow. After decomposing the work order, WO optimizer and decomposer 256 may forward the decomposed work order to WO server 252.

WO server 252 may receive the decomposed work order and save the decomposed work order in database 432. WO server 252 may also forward the decomposed WO to WO estimator 254. WO estimator 254, as described above, may generate an estimate associated with executing the work order (block 520).

For example, WO estimator 254 may generate an estimate (e.g., in RCUs and time) associated with the work order. WO estimator 254 may also store the estimates (e.g., RCU and time estimates) and risk factor for each work unit task in, for example, database 432. WO server 252 may also forward the work order to WO scheduler 258. WO scheduler 258 may receive the work order and check capacity associated with NEs and UGs and the allocation of NEs/UGs needed to execute the work order (block 530).

Resource management system 250 may determine the appropriate WO execution engine 270 to fulfill the order (block 540). For example, WO scheduler 258 may identify which of execution engines 270A/B is best suited to handle the work order. The identification may be based on, for example, the amount of jobs in job queues 472 and 474, the time frame/deadline associated with the order, the bandwidth/throughput associated with engines 270A/B, etc. Resource management system 250A may designate the execution engine 270A/B that will be used to fulfill the order as the primary engine or site and the other execution engine as the secondary engine or site for executing the order (block 540). In this case, assume that resource management system 250A designates execution engine 270B as the primary engine/site and engine 270A as the secondary engine/site.

In other implementations, resource management system 250 may estimate and allocate resources at the WO execution engine 270 associated with the customer preferred site/service area. For example, if site 410 is designated by the customer as the preferred site, resource management system 250A may estimate and allocate resources associated with the order against the pool of resources associated with WO execution engine 270A.

Resource management system 250A may then forward the work order to the primary site (i.e., execution engine 270B in this example) or the customer preferred site (block 550). Assume that execution engine 270B receives the order and stores the order in job queue 474 for execution at the scheduled time (block 550).

In an exemplary implementation, order management systems 220A and 220B may communicate with each other to synchronize databases 422 and 424 and resource management systems 250A and 250B may communication with each other to synchronize databases 432 and 434 (block 560). For example, order management system 220A and 220B may exchange information stored in databases 422 and 424 at predetermined times so that databases 422 and 424 maintain the same information. Similarly, resource management systems 250A and 250B may exchange information stored in databases 432 and 434 at predetermined times so that databases 432 and 434 maintain the same information. In this manner, if a problem occurs in one of sites 410 or 420, the other site can recover from the problem/error.

In addition, when content is received and being processed at one of sites 410/420, the content may be replicated at the other one of sites 410/420 for backup and recovery purposes. After successful order execution, content that was, for example, ingested, decrypted, transcoded, encrypted and packaged, in site 410 may be copied to site 420. Temporary storage in sites 410 or 420 associated with earlier stages of processing the content may be purged or deleted. In this manner, if a problem/error occurs in one of sites 410/420, the content may be provided via the other site.

Figure 6:
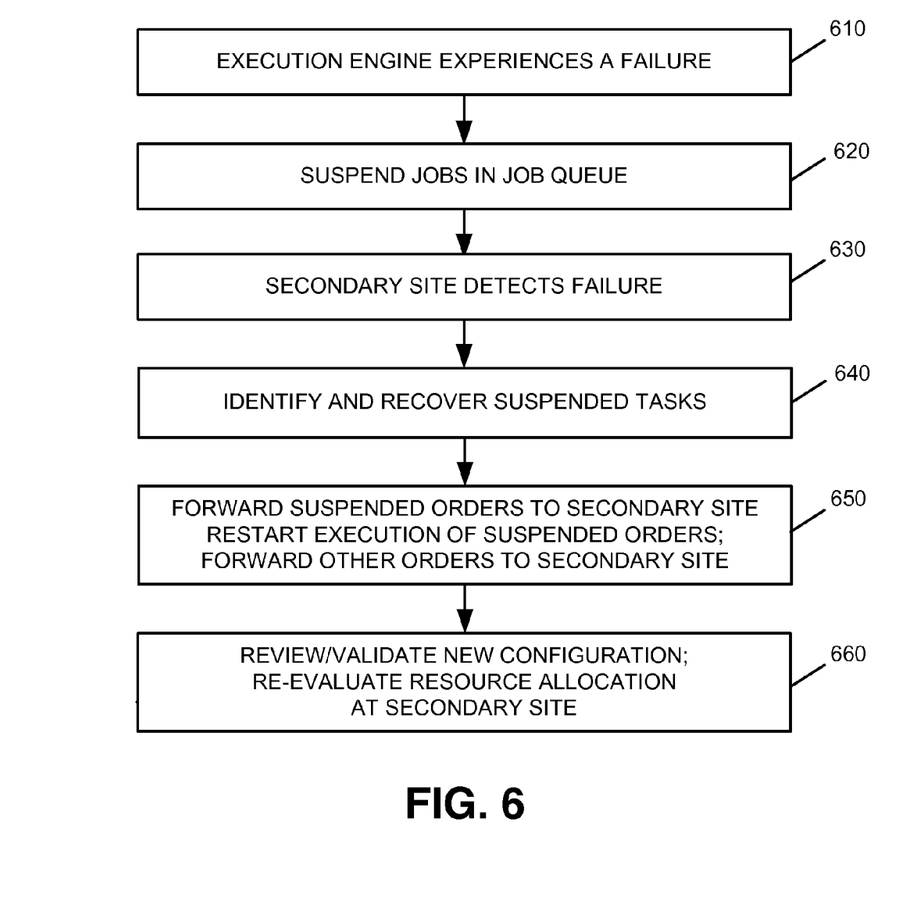

As discussed above, architecture 400 may allow for inter-site recovery when a problem is detected in one of sites 410 or 420. FIG. 6 illustrates exemplary processing associated with inter-site recovery. Processing may begin with one of the components of sites 410 or 420 experiencing a failure or other problem. For example, assume that WO execution engine 270A of site 410 experiences a failure (block 610). In this scenario, when execution engine 270A experiences a failure, jobs in job queue 472 will be suspended (block 620). As discussed briefly above, in some implementations, the jobs in job queue 472 may include identifiers. In this example, all jobs in queue 472 may be labeled "suspended" after the problem is detected. Alternatively, jobs that are executing or scheduled for execution within a predetermined period of time (e.g., one hour, four hours, eight hours, etc.) may be marked as suspended and jobs that are scheduled for execution at times outside the predetermined period of time/window may remain marked as "pending," "scheduled," or using some other identifier indicating that they are not scheduled for execution within the predetermined window of time.

Resource management system 250B may detect the failure of execution engine 270A (block 630). For example, resource management system 250B may monitor the status of jobs in the job queue at its own site (i.e., job queue 474 of execution engine 270B) and the status of jobs in the job queue at the other site (i.e., job queue 472 of execution engine 270A), as indicated by the dotted lines in FIG. 4. In this scenario, resource management system 250B may determine that a failure or problem has occurred by identifying jobs that have been suspended in WO execution engine 270A. That is, jobs labeled "suspended" may indicate a failure in WO execution engine 270A. In alternative implementations, resource management system 250B may exchange status inquiry messages, handshaking messages, etc., with site 410 (e.g., resource management system 250A, WO execution engine 270A, etc.) to determine whether site 410 is operational and is able to execute its queued work orders/tasks. In either case, assume that resource management system 250B detects the failure in execution engine 270A.

Resource management system 250B may identify the suspended orders in job queue 472 at site 410 (block 640). For example, resource management system 250B may identify jobs that are labeled suspended, jobs for which processing has been stopped, and/or jobs that are awaiting execution after their scheduled start times (referred to collectively as suspended jobs). Resource management system 250B may then recover the suspended jobs and forward the suspended orders identified in job queue 472 to execution engine 270B for execution (block 650). For example, as described above, resource management systems 250A and 250B may synchronize databases 432 and 434. In this case, resource management system 250B may identify the suspended jobs/tasks in job queue 472, retrieve the identified jobs/tasks from database 434 and forward the suspended jobs to job queue 474 for execution by WO execution engine 270B. Resource management system 250B may also forward other orders awaiting execution in site 410 (e.g., orders scheduled for execution) to site 420 (block 650).

In an exemplary implementation, administrative personnel responsible for monitoring DDC 150 may provide an operational review prior to executing the suspended jobs via execution engine 270B (block 660). For example, administrative personnel may validate or approve the new configuration of jobs to be executed by execution engine 270B to ensure that execution engine 270B has adequate resources to handle the newly assigned jobs. Resource management system 250B and/or personnel responsible for monitoring DDC 150 may also re-evaluate resource allocation at site 420 based on the new orders assigned/transferred to site 420. If necessary, resource management system 250B may re-allocate previously allocated resources to process orders from site 410 at site 420. In this manner, sites 410 and 420 may provide for recovery from a problem in one of sites 410 or 420. In other words, resource management systems 250A/B support inter-site recovery from problems/errors occurring in one of sites 410 and 420. Resource management systems 250A/B also support intra-site jeopardy conditions by monitoring and performing allocations of resources and de-allocation of resources, as described in more detail below.

Figure 7:
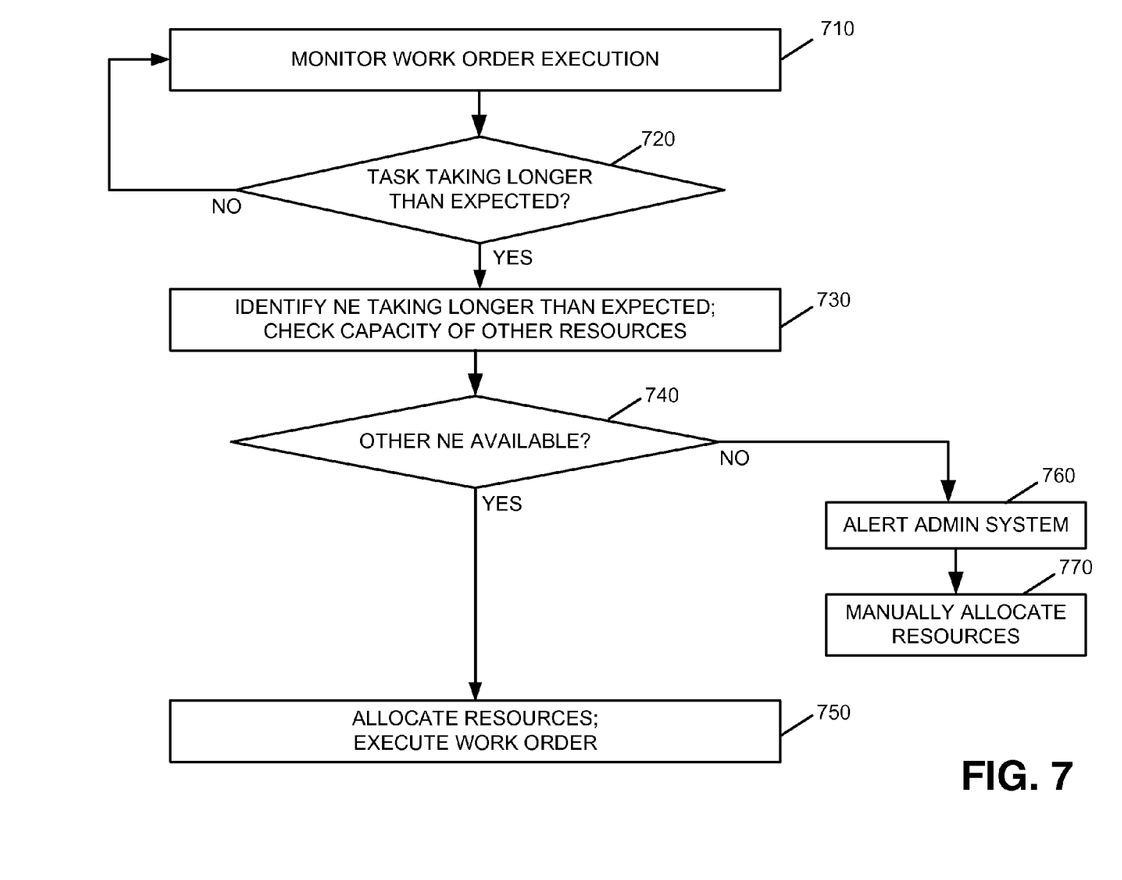

FIG. 7 illustrates exemplary processing associated with intra-site recovery. Processing may begin with resource management system 250A/B monitoring work order execution (block 710). For example, assume that resource management system 250B is monitoring tasks performed by execution engine 270B. In an exemplary implementation, resource management system 250B may monitor the execution of tasks against an expected schedule of task executions.

Resource management system 250B may determine if a job/task being performed at an NE is taking longer than expected (block 720). For example, resource management system 250B may access WO scheduler 258 to determine an estimated execution time for each of the tasks that are being executed. Resource management system 250B may then determine if a particular task (e.g., transcoding of a media file from one format to another format) is taking longer than expected, such as at least a predetermined amount of time greater than expected (e.g., 10% longer than expected, 40% longer than expected, etc.). If a task is not taking longer than expected (block 720—no), resource management system 250B may continue to monitor work order execution. If, however, one or more tasks is taking longer than expected (block 720—yes), resource management system 250B may identify the NE (e.g., transcoder) that is taking longer than expected on the task (block 730). Resource management system 250B may also check the capacity of other NEs that may be available to perform other tasks scheduled for the NE that is taking longer than expected on the current task (block 730).

Figure 8:
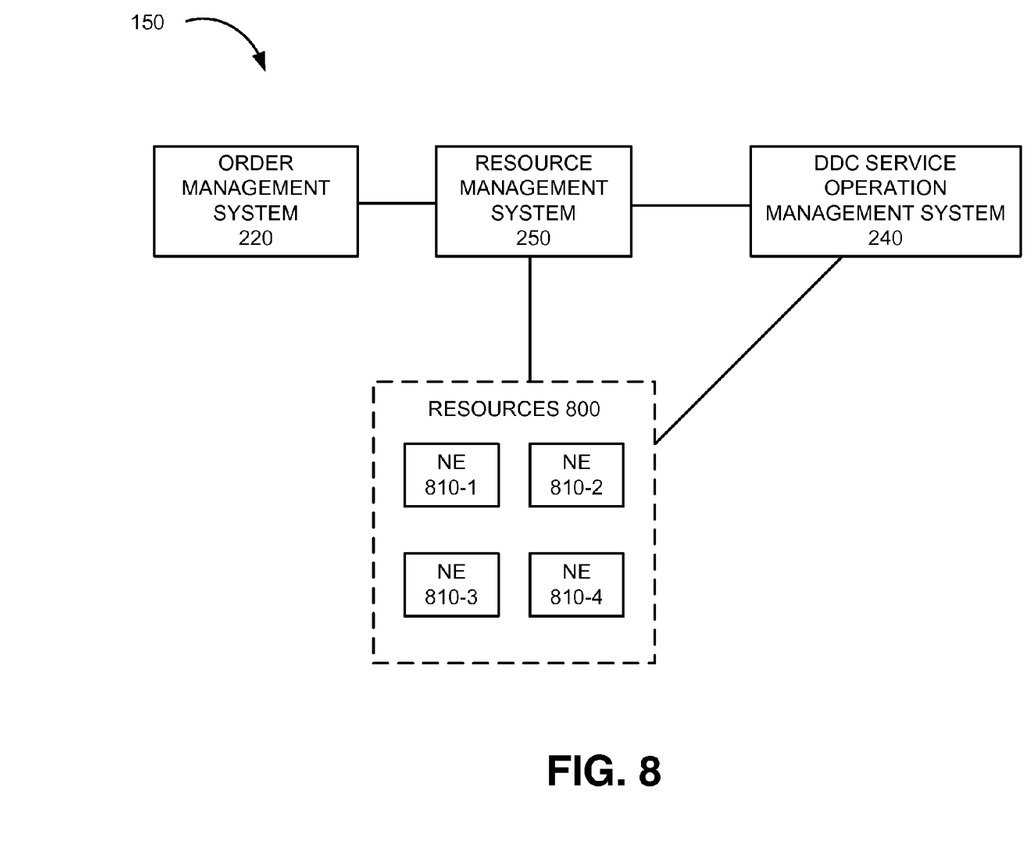
FIG. 8 is a block diagram associated with the processing of FIG. 7.

For example, FIG. 8 illustrates an exemplary portion of DDC 150. Referring to FIG. 8, DDC 150 includes order management system 220, resource management system 250, DDC service operation management system 240 and resources 800 for one of sites 410/420. Resources 800 may include a number of network elements (NEs) 810-1 through 810-4 used to execute work orders. In this example, assume that NE 810-1 is executing a task and that resource management system 250 determines that the task is taking longer than expected. In this case, resource management system 250 may check the capacity of other NEs (e.g., NEs 810-2, 810-3 and 810-4) to attempt to locate another NE that may be used to perform tasks scheduled for NE 810-1 (block 740).

Continuing with this example, if resource management system 250 determines that another NE is available to perform tasks scheduled to be executed by NE 810-1 (block 740—yes), resource management system 250 may allocate the resources and the allocated resources may execute the tasks/work order (block 750). For example, assume that resource management system 250 determines that NE 810-4 includes a transcoder that is capable of transcoding from AVI format to WMV format. Further assume that NE 810-1 was scheduled to perform an AVI to WMV transcoding for a media file at 10:00 AM on a particular date and that resource management system 250 checks a schedule of tasks to be performed by NE 810-4 and determines that NE 810-4 has the capacity (e.g., available RCUs) to perform the AVI to WMV transcoding at 10:00 AM on that particular date. In this case, resource management system 250 may designate or assign NE 810-4 as the appropriate resource to execute the transcoding task previously assigned to NE 810-1. Resource management system 250 may also designate other NEs as the appropriate resources to execute one or more tasks previously scheduled for NE 810-1.

If, however, resource management system 250 is unable to identify another resource to execute tasks scheduled for the NE that may be taking longer than expected (block 740—no), resource management system 250 may provide an alert to DDC service operation management (SOM) system 240 to alert administrative personnel of a potential problem (block 760). For example, resource management system 250 may signal an operator terminal at DDC SOM system 240. In some implementations, an operator/administrative personnel responsible for managing DDC 150 may perform a manual allocation of resources to re-allocate resources to process the jobs/tasks that are awaiting execution by the NE that is taking longer than expected on a current task (block 770). In this manner, DDC 150 may provide for detection and recovery from a problem within a site, such as an NE taking longer than expected to perform a task.

Implementations described herein include an infrastructure that provides for efficient processing of customer orders, as well as redundancy in some or all of the processing components. In addition, the infrastructure allows for recovery from problems or failures that may occur during processing.

The foregoing description of exemplary implementations provides illustration and description, but is not intended to be exhaustive or to limit the embodiments to the precise form disclosed. Modifications and variations are possible in light of the above teachings or may be acquired from practice of the embodiments.

For example, features have been described above with respect to components of DDC 150 performing various tasks to process orders. In other implementations, other components, systems, platforms, etc., in DDC 150 may perform some or all of these tasks. For example, in some implementations, functions of the order management system 220, resource management system 250 and WO execution systems 270 may be combined in a single system/platform.

In addition, tasks associated with a work order that involves transcoding a media file have been described above. It should be understood that other types of orders may be processed by DDC 150. For example, other types of orders may include inserting advertisements or logos into a media file, concatenating a second media file to the media file (e.g., concatenating episodes of a series together), inserting black space into at least a portion of the media file, performing audio transcoding on the media file, etc.

Further, while series of acts have been described with respect to FIGS. 5-7, the order of the acts may be varied in other implementations. Moreover, non-dependent acts may be implemented in parallel.

It will be apparent that various features described above may be implemented in many different forms of software, firmware, and hardware in the implementations illustrated in the figures. The actual software code or specialized control hardware used to implement the various features is not limiting. Thus, the operation and behavior of the features were described without reference to the specific software code—it being understood that one of ordinary skill in the art would be able to design software and control hardware to implement the various features based on the description herein.

Further, certain portions of the invention may be implemented as "logic" that performs one or more functions. This logic may include hardware, such as one or more processors, microprocessors, application specific integrated circuits, field programmable gate arrays or other processing logic, software, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A computer-implemented method, comprising:
    receiving a first order associated with processing a media file;
    forwarding the first order to a first resource management system;
    identifying, by the first resource management system, a plurality of tasks for fulfilling the first order;
    storing the plurality of tasks;
    identifying, by the first resource management system, a first one of a plurality of execution systems to execute the plurality of tasks;
    forwarding, by the first resource management system, the plurality of tasks to the first execution system;
    designating a second one of the plurality of execution systems as a backup system;
    detecting, by a second resource management system, a failure or problem in the first execution system;
    identifying, in response to detecting the failure or problem in the first execution system, suspended tasks scheduled for execution by the first execution system; and
    executing, by the second execution system, the suspended tasks.

2. The computer-implemented method of claim 1, wherein the plurality of execution systems are located in different sites.

3. The computer-implemented method of claim 2, wherein the detecting a failure or problem comprises:
    detecting, by the second resource management system, the failure or problem based on the suspended tasks scheduled for execution by the first execution system.

4. The computer-implemented method of claim 3, further comprising:
    retrieving, by the second resource management system, the suspended tasks; and
    forwarding, by the second resource management system, the suspended tasks to the second execution system.

5. The computer-implemented method of claim 1, further comprising:
    monitoring, by the second resource management system, statuses associated with jobs to be executed by the first execution system, wherein the detecting a failure or problem comprises:
    detecting the failure or problem based on the monitoring.

6. The computer-implemented method of claim 1, further comprising:
    monitoring, by the first resource management system, execution of the plurality of tasks;
    determining, based on the monitoring, whether at least one task is taking longer than expected to complete; and
    identifying, in response to determining that at least one task is taking longer than expected to complete, a first network element associated with executing the at least one task.

7. The computer-implemented method of claim 6, further comprising:
    determining whether a second network element has capacity to execute tasks scheduled for execution by the first network element; and
    re-assigning at least some of the tasks scheduled for execution by the first network element to the second network element.

8. The computer-implemented method of claim 1, wherein the first order is associated with at least two of:
    transcoding the media file from a first format into at least one other format,
    inserting an advertisement or a logo into the media file,
    concatenating a second media file to the media file,
    inserting black space into at least a portion of the media file, or
    performing audio transcoding on the media file.

9. A system, comprising:
    a first execution system comprising at least a first processor;

a first order management system comprising at least a second processor configured to:
   receive a first order associated with processing a first media file and with a stored workflow, and
   route the first order;
a first resource management system comprising at least a third processor configured to:
   receive the first order from the first order management system,
   identify a plurality of tasks associated with the workflow,
   store the plurality of tasks,
   identify the first execution system from a plurality of execution systems to execute the plurality of tasks,
   forward the plurality of tasks to the first execution system, and
   designate a second execution system as a backup system,
wherein the first execution system is configured to:
   execute the plurality of tasks; and
a second resource management system comprising at least a fourth processor configured to:
   detect a failure or problem in the first execution system,
   identify suspended tasks scheduled for execution by the first execution system, and
   forward at least some of the suspended tasks to the second execution system.

10. The system of claim 9, further comprising:
the second execution system, wherein the second execution system is located at a different physical site than the first execution system.

11. The system of claim 9, wherein the second execution system is configured to:
execute the at least some of the suspended tasks.

12. The system of claim 9, wherein the second resource management system is configured to:
   monitor statuses associated with jobs to be executed by the first execution system, and
   detect the failure or problem based on the statuses.

13. The system of claim 12, wherein the first resource management system includes a first database and the second resource management systems includes a second database, wherein the first and second resource management systems are configured to synchronize the first and second databases, and wherein the second resource management system is configured to:
   forward tasks from the second database to the second execution system in response to detecting the failure or problem.

14. The system of claim 9, wherein the first resource management system is further configured to:
   monitor execution of the plurality of tasks,
   determine, based on the monitoring, whether at least one task is taking longer than expected to complete, and
   identify, in response to determining that at least one task is taking longer than expected to complete, a first network element associated with executing the at least one task.

15. The system of claim 14, wherein the first resource management system is configured to:
   determine whether a second network element has capacity to execute tasks scheduled for execution by the first network element, and
   re-assign at least some of the tasks scheduled for execution by the first network element to the second network element.

16. The system of claim 9, wherein the first order is associated with at least one of:
   transcoding the first media file from a first format into at least one other format,
   inserting an advertisement or a logo into the first media file,
   concatenating a second media file to the first media file,
   inserting black space into at least a portion of the first media file, or
   performing audio transcoding on the first media file.

17. A method, comprising:
   receiving an order associated with transcoding a media file;
   identifying a plurality of tasks associated with transcoding the media file;
   storing the plurality of tasks;
   identifying a first execution system from a plurality of execution systems to execute the plurality of tasks;
   forwarding the plurality of tasks to the first execution system;
   designating a second execution system as a backup system;
   monitoring execution of the plurality of tasks;
   detecting a failure or problem in the first execution system based on the monitoring;
   identifying other orders to be executed by the first execution system; and
   executing at least some of the other orders at the second execution system, in response to identifying the failure or problem in the first execution system.

18. The method of claim 17, further comprising:
   determining, based on the monitoring, whether at least one task is taking longer than expected to complete;
   identifying, in response to determining that at least one task is taking longer than expected to complete, a first network element associated with executing the at least one task;
   determining whether a second network element is capable of executing tasks scheduled for execution by the first network element; and
   re-assigning at least some of the tasks scheduled for execution by the first network element to the second network element.

19. The method of claim 18, wherein the determining whether a second network element is capable of executing tasks scheduled for execution by the first network element comprises:
   checking a schedule associated with tasks to be performed by the second network element, and
   determining whether the second network element has capacity to execute at least some tasks scheduled for execution by the first network element.

* * * * *